United States Patent [19]

Warner et al.

[11] Patent Number: 5,101,141
[45] Date of Patent: Mar. 31, 1992

[54] LIGHTING CONTROL

[75] Inventors: Kenneth J. Warner, Sutton Coldfield; David A. Hart, Dunston, both of England

[73] Assignee: Legrand Electric Limited, England

[21] Appl. No.: 625,633

[22] Filed: Dec. 6, 1990

Related U.S. Application Data

[63] Continuation of Ser. No. 382,652, Aug. 7, 1989, abandoned.

[30] Foreign Application Priority Data

Dec. 8, 1987 [GB] United Kingdom .................. 8728656
Dec. 7, 1988 [GB] United Kingdom .. PCT/GB88/01055

[51] Int. Cl.$^5$ ............................................. H05B 37/02
[52] U.S. Cl. ..................................... 315/297; 315/312; 315/318; 315/360
[58] Field of Search ............... 315/250, 291, 294, 297, 315/312, 360, 316, 318

[56] References Cited

U.S. PATENT DOCUMENTS

| | | | |
|---|---|---|---|
| 4,095,139 | 6/1978 | Symonds et al. | 315/294 X |
| 4,217,646 | 12/1978 | Caltagirone et al. | 364/493 |
| 4,240,011 | 12/1980 | Dinges et al. | 315/294 X |
| 4,388,567 | 6/1983 | Yamazaki et al. | 315/294 X |
| 4,461,977 | 12/1982 | Pierpoint et al. | 315/159 |
| 4,489,385 | 11/1981 | Miller et al. | 315/312 X |
| 4,574,355 | 11/1983 | Beatty et al. | 364/492 |

*Primary Examiner*—David Mis
*Attorney, Agent, or Firm*—Banner, Birch, McKie & Beckett

[57] ABSTRACT

From one aspect the invention provides apparatus for controlling mains electrical circuits including lighting circuits, comprising a remotely controlled receiver unit responsive to received control signals, the receiver unit comprising means for decoding such received control signals in relation to at least two controlled channels for said circuits, means for each channel responsive to plural decoded control signal possibilities for providing signals for the said channel concerned, and selection means associated with the signal providing means for selecting whether or not particular said decoded signal possibilities result in said signals being available and applied to said channel. From another aspect the invention provides apparatus for controlling mains electrical circuits including lighting circuits, comprising control units local to areas or zones served by corresponding said circuits, each local control unit comprising means responsive to local occupancy sensing for switching on of one or more of said circuits and means responsive to other received signals for overriding such switching on irrespective of local occupancy sensing.

12 Claims, 2 Drawing Sheets

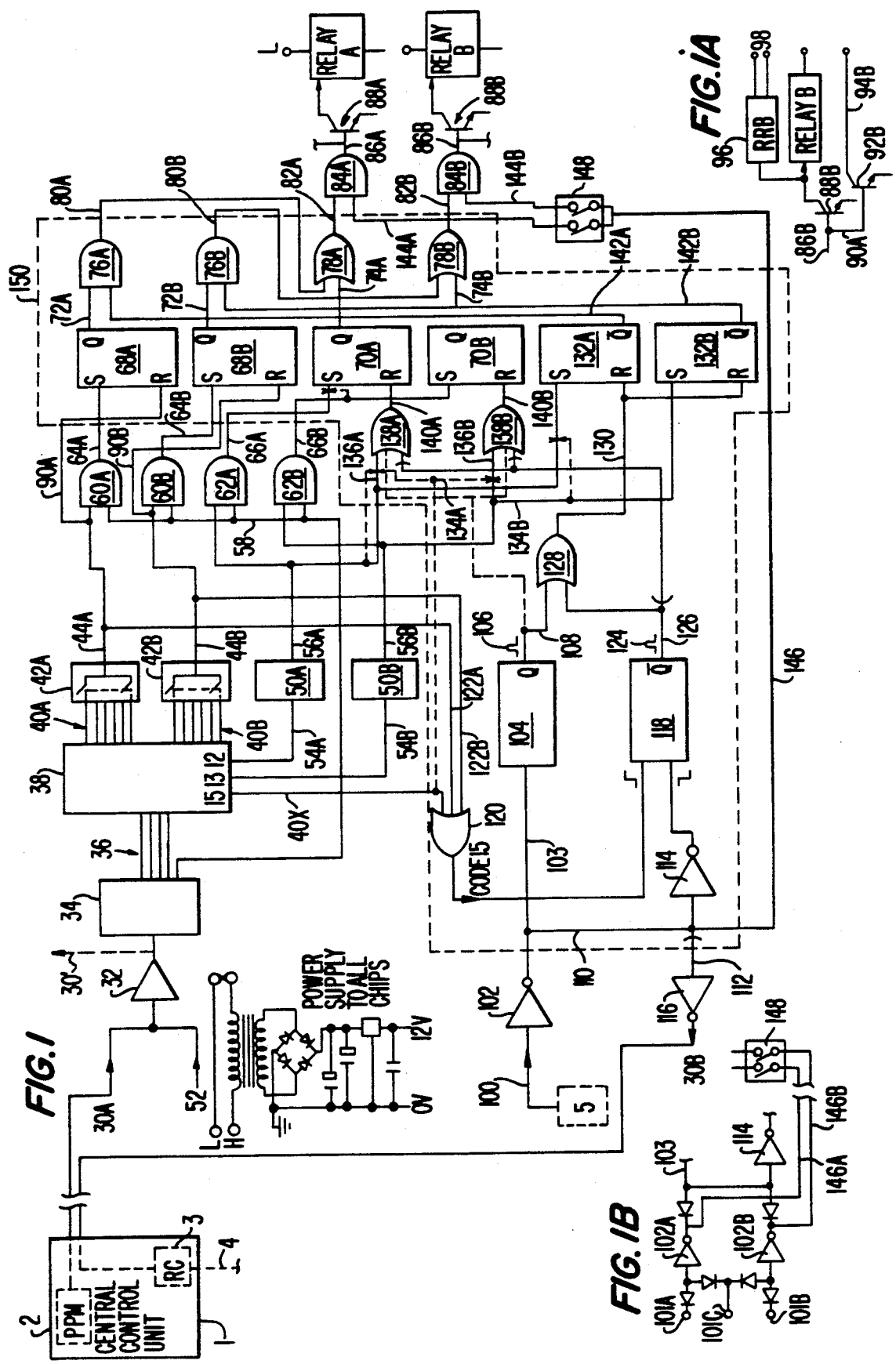

LIGHTING CONTROL

This application is a continuation of application Ser. No. 07/382,652, filed Aug. 7, 1989, now abandoned.

DESCRIPTION

This invention relates to control of mains electrical circuits, particularly but not exclusively lighting circuits.

It is useful to be able to provide a range of ways in which lighting circuits are controlled, for example including response to occupancy sensing so as to reduce power consumption by automatically switching lights off when the space served is not occupied by a person or persons, usually after a preset interval following last detection of occupant presence/movement, say by an infra-red or other sensor, but switching those lights back on at next sensing of an occupant. There are, however, various reasons and circumstances for and in which such occupancy sensing control needs to be overridden, for example "off" in a room where slide projection is required, and/or "on" in a corridor or other space where more permanent lighting is or may be required.

There is need for a versatile remotely signalled controller for lights, or other electrical circuits, i.e. capable of accommodating to a wide range of requirements, and it is one object of this invention to provide a remote signal receiver unit for such purposes.

According to one aspect of this invention there is provided a remote control receiver unit comprising means for decoding received signals, conveniently from signal transmission in pulse-position-modulated (PPM) format to parallel signals according to binary digit representations of the received signals; at least one channel, usually two, perhaps more, channels, for controlling a lighting and/or other electrical circuit or circuits according to signals thereon; means for the or each said channel responsive to plural decoded signal possibilities for providing signals for that channel; and selection means associated with the last-mentioned means for selecting whether or not particular said decoded signal possibilities result in signals being available and applied to said channel.

Another aspect of this invention concerns local control units that are operable at least in response to local occupancy sensing, preferably with selective override, say by portable or other local infra-red transmitting means at least for switching off of lights irrespective of occupancy sensing then further preferably with automatic reversion to normal occupancy sensing response after a set period of non-occupancy being sensed; and/or with provision for linking units from one immediate zone to the next zone or otherwise, so that a master-/slave system can result, preferably flexibly, say including with preceding zone units switched off. Such local control units could resemble the aforesaid receiver units apart from requirement for reception of control signals, indeed may effectively be provided as a mode of operation of such receiver units, say a mode to which the local receiver unit can normally always reset but from which it can be shifted by a central control unit if present.

For two or more channels, whether just for different sets of normal luminaires, or one for heating and/or ventilation and/or one for emergency lighting as a control additional to required permanent line connection and basic loss-of-mains enablement, individual channels may be separately or jointly controlled by local sensors for occupancy as will be further explained, or otherwise for other conditions, such as smoke detection, natural light level, temperatures etc. Logging of circuit operations may also be preferred, usually centrally at a said control unit.

A suitable overall system for utilising such receiver units and a central control unit for sending out signals to be decoded by the or each receiving unit, whether for a whole building or for a floor thereof and with various component areas or zones served by respective ones of receiver units, can serve to set certain overall parameters and to cope with certain prevailing conditions. Overall parameters for premises concerned would normally include matters related to expected use of the system, effectively of a said building or floor, say as to hours of usage and/or conversely or to normally unused or sleeping times, and matters relating to normal hours of daylight and darkness. Thus, there may be different levels of normally prescribed lighting, say in terms of how many, if any, of available lighting units are on, which could be according to the time of day and whether or not an area is a common service area or primarily a local-usage area. Moreover, there may be additional requirements or modifications to normal requirements according to whether or not actual natural light levels are higher or lower than normal, as may be sensed by a photocell, or whether there is occupancy requiring change to common service area lighting, as may be sensed by a common service area occupancy sensor or by feed back from any of local area occupancy sensors, or whether there is some emergency such as a fire alarm. A typical control unit using present day technology would be of electronic micro-processor controlled type.

At least when used in a system having such a control unit, there will be a clear need for various different decoding possibilities to operate any particular controlled lighting circuit. In addition, however, remotely controlled receiver units hereof permit substantial further fine-tuning to requirements of areas served, simply by selecting or deselecting response capability for each or some of such decoding possibilities.

Preferably, such receiver units further provide for a measure of local control at least according to local occupancy sensing, particularly in switching off lights that would otherwise be on in unoccupied areas, further preferably then with return signalling to the control unit, at least for common service area lighting specifying purposes, if not further for other building/floor systems, for example air conditioning/heating outside normal working hours if two or more zones have sensed occupancy. Moreover, further control by active infra-red signal devices could enable and/or cause modifications of local and/or system control action, say as a security service does a night patrol.

In one embodiment of receiver unit hereof, decoding from serial binary to parallel binary, say for five bits, is followed by decoding from binary to one-out-of-n outputs, say for energising one of up to sixteen outputs for four of said five bits, and such outputs have associated preset, say switch, means operable locally of the receiver unit to permit or deny availability of at least some of such outputs for energisation, say of two sets of six each set serving one lighting circuit or set of circuits, which sets may be interleaved positionally, say alternating in position over a ceiling, and/or segregated as to type, e.g. wall and ceiling lights. Only a single common output is required from the switch means, or one for each said set, to determine system selection where any permitted output of the second mentioned output is energised, say to follow such output. Local selection control can be provided, say relative to a locally generated one or more of the second—decoding outputs, or equivalent thereto, to give a local output or outputs one for each set if selected, say to allow local control by passive infra-red occupancy sensors, and/or local activation say by way of an active infra-red transmitter and a corresponding local receiver at the receiver unit. One of the bits from first-mentioned decoding may be used to specify whether a lights "on" or "off" instruction is involved, say by way of logic gates for said system selection outputs and/or said local outputs.

It is further preferred, in such an embodiment for logic gate outputs to control latches for system and/or local output control of the associated lighting circuit or circuits one for each said set, usually further with a latch or latches for any associated local occupancy sensing system, say of passive infra-red type, conveniently via further logic gates for outputs of the latches to relay drive circuits for the lighting circuit or circuits as such. Provision can then be and for outward transmission from receiver units hereof to a system control unit for local occupancy sensing, say to cause the system control unit to send out signals to switch on other lighting circuits, for example in common service areas. One of the second decode outputs may be used for preventing any tendency otherwise for a lock-up to occur if no such local occupancy sensing is actually fitted.

It is advantageous for receiver units hereof to have connections that can be made or unmade readily, say of plug-and-socket type, whether for connections to lighting circuits or for connections to occupancy sensors or for connections to links between receiver units hereof so that several may be served together effectively in series or otherwise in extended interconnected relationship. An auxiliary mains supply socket is also useful in case a receiver unit fails or needs disconnection of a light or lights for servicing.

In general, receiver units hereof will have a mains electrical connection thereto, say of the usual three-core type, but require only a further two-core connection to the control unit, one core for input of said serial control signals to be decoded and the other for output of an occupancy sensing signal. An alternative would be for signalling between the local receiver and central control units to be by modulation of mains electrical current, i.e. requiring no specific control signal wiring.

Constructionally, it is preferred and advantageous for all electronics hereof to be on a printed circuit board that is conveniently secured to a cover for a receiver unit box with access to connection sockets so as to be particularly readily used and serviced.

Specific implementation of one embodiment of this invention will now be described, by way of example, with reference to the accompanying drawings, in which:

FIG. 1 is a block circuit diagram;

FIG. 1A is a schematic of an alternative embodiment of the output 86B portion of the schematic of FIG. 1;

FIG. 1B is a schematic of an alternative embodiment of FIG. 1 showing separate control of channels A and B.

Figure 3:
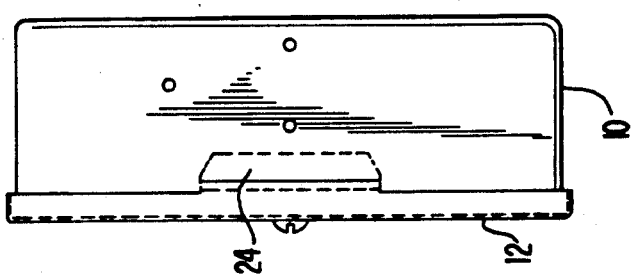
FIGS. 2, 3 and 4 are front side and end elevational views of a receiver unit.
Figure 2:
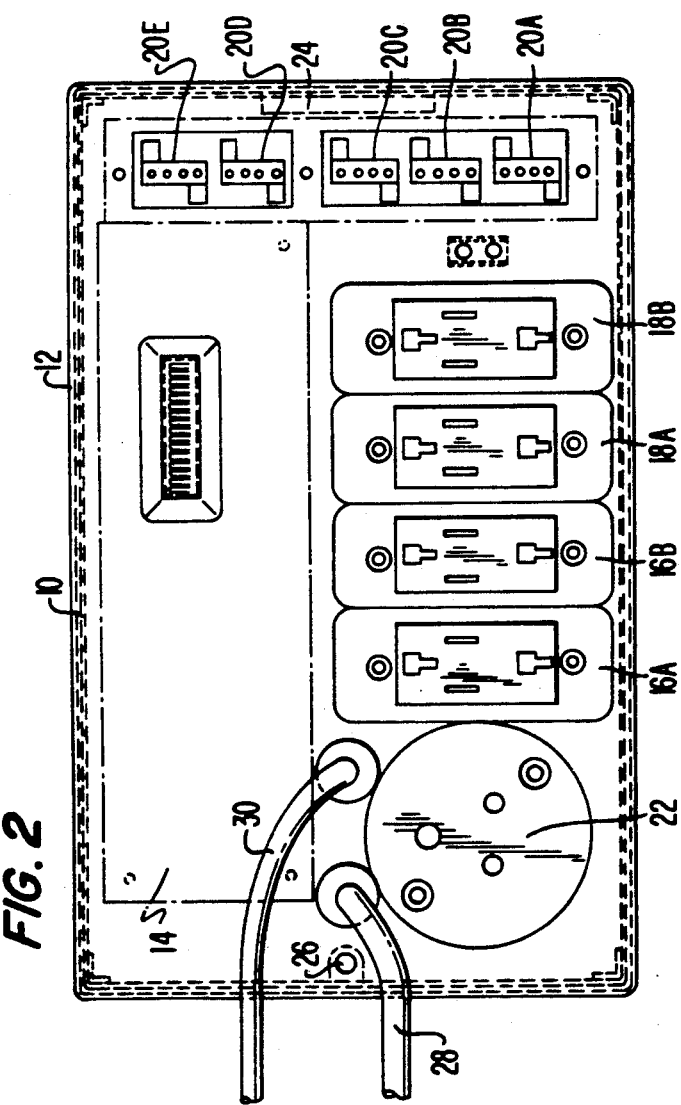
Figure 4:
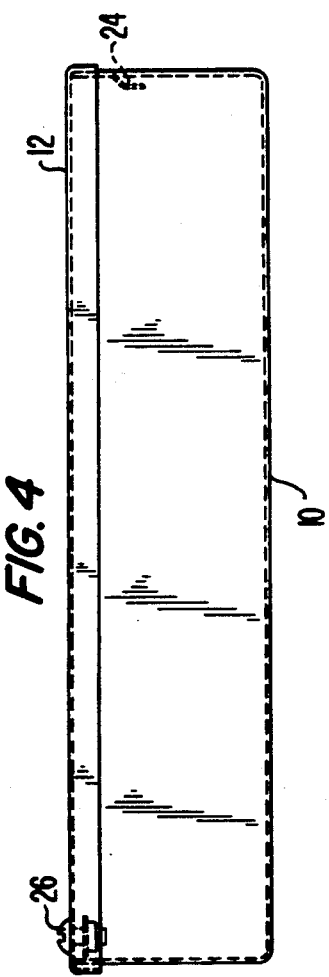

In the drawings, referring first of FIGS. 2, 3 and 4, a receiver unit box 10 has a cover 12 capable of carrying a printed circuit board and affording access to lighting circuit connection sockets 16A, B and 18A, B, other connection sockets 20A, B, C, D, E, and an auxiliary mains supply socket 22, all themselves connected to the printed circuit board secured thereto or to the cover 12. Electronics on the board 14 will be available at removal of the cover 12, being on the then-open side of the board 14, i.e. facing into the box 10. Cover retention of tongue-and-slot type at 24 and screw-type at 26 is also indicated. Mains electrical supply is indicated at three-core cord or cable 28 and system control connection indicated at two-core cord or cable 30.

Turning to FIG. 1, system input from a control unit (see box 1) is shown at 30A, actually one core of cord or cable 30 whose other core 30B is for signals out of the receiver unit to the control unit, actually for alerting the latter in the event of occupancy sensing relative to the former. Input signals on line 30A will be of serial binary type, effectively pulse position modulated (see box 2), and are shown amplified at 32, usually accompanied by suitable signal clamping and conditioning. The serial input signals from amplifier 32 are converted to parallel at 34, outputs 36 indicating use of a five-bit control signal. The converter 34 will have customary clothing and reset to zero provisions. Four of the outputs 36, actually the least significant, go to a binary-to-one-out-of-16 converter 38. Two sets 40A, B of six outputs of the converter 38 go to switched selectors 42A, B for local normal selection, by switch setting one per input line, controlling connection through to switch selector outputs 44A, B. The selectors 42A, B and their outputs 44A, B serve for enablement under system control from said control unit according to sets of six possible decodings in converter 38.

Other switch selectors 50A, B are shown for selecting for local control according to some codes available at 52 conveniently comprising codings at least normally reserved for local use, hence being shown going via amplifier 32 and converters 34, 38 to lines 54A, B into local switch selectors 50A, B, thence to their outputs 56A, B. In practice, the lines 54A, B will usually be taken from the outputs from the decoder 38 to conform with transmissions from the central control unit 1.

The fifth of outputs 36 from the converter 34 is used for specifying whether the system signal concerned relates to switching lights "on" or "off" and is shown going on line 58 to two-input gates 60A, B and 62A, B that receive respective ones of switch selector outputs 44A, B and 56A, B on their other inputs. Outputs 64A, B and 66A, B of the gates 60A, B and 62A, B go to set inputs of system latches 68A, B and local latches 70A, B whose outputs 72A, B and 74A, B go to two-input gates 76A, B and 78A, B. Outputs 80A, B of the gates 76A, B go to other inputs of the gates 78A, B whose outputs 82A, B go to two-input gates 84A, B whose outputs 86A, B control whether or not relay drive transistors 88A, B are conducting or non-conducting and hence control states of related relays (not shown) themselves controlling supply to associated electric lighting circuits, actually connected to the sockets 16A, B and 18A, B, respectively, of FIG. 2. Resets for the system latches 68A, B are shown from branches 90A, B off outputs of 44A, B of the system switch selectors 42A, B.

Outputs 86A, B also branch at 90A, B to other drive transistors 92A, B for providing an output 94A, B connected in common with others on a current sinking basis for triggering timing out of at least a group of local control units or receiver units by overall timing means (not shown). That is shown only for 86B in FIG. 1A. The common current sink line for output 94A, B can then serve instead of the return 30B to the central control unit. Another relay 96 is also shown driven by the transistor 88B for providing open or closed contacts 98 for other control circuitry, say of heating/ventilating means.

Local control is selected via switches A, B, say based on occupancy sensing, passive infra-red type being suitable (though others could be used), see box 5, is in response to sensor input at 100A via inverter 102 and its output 103 to a monostable circuit 104 that produces pulse signals 106 on its output 108 on appropriate transitions of sensor input 100A. Output 103 from inverter 102 is shown branched at 110 to join line 112 serving as input to two inverters 114 and 116, the latter serving to apply a signal to the line 30B. Such signals (30B) to the central control unit will have various implications for lighting control, and may further have application in controlling other, then related, systems of the building (see box 3 and line 4), for example air-conditioning and/or heating that may itself be organised on a zoned basis, conveniently correlated with lighting zones, say for actuation outside usual hours, usually if at least two zones show occupancy at the same time, i.e. so as not to respond to simple security patrols.

The other inverter 114 supplies input signals to another monostable circuit 118 also receiving input from a three-input gate 120 applied from branches 122A, B off the system switch selector outputs 44A, B and from a decode output line 40X from the converter 38.

As shown in FIG. 1B, there may be separate control of channels A and B by way of inverters 102A, B from lines 100A, B from connectors 101A, B, C for either or both channels to be commenced, whether from a switch for those connectors 101 relative to one or two occupancy sensors, or just by the connections made.

Pulses 106, 124 on outputs 108, 126 from the monostables 104, 118 go to a two-input gate 128 whose output 130 goes to Reset inputs of occupancy control latches 132A, B of which Set inputs are connected to branches 134A, B from outputs 56A, B of the local switch selectors 50A, B. Those outputs 56A, B are further taken at 136A, B to inputs of two-input gates 138A, B whose other inputs come from output 126 of the monostable 118 and whose outputs 146A, B go to Resets of the local control latches 70A, B. Inverted outputs 142A, B of the occupancy control latches 132A, B are connected to the other inputs of the gates 76A, B and other inputs 144A, B of the gates 84A, B get a signal from the occupancy sensor input by extension 146 of the line branch 110 from output 103 of inverter 102 via a switch 148 that is in its "on" or "off" state according to whether or not local occupancy control is allowed or fitted. The purpose of the gate 120 is to assure that controlled lights cannot lock "on" if no local occupancy control is fitted.

Inputs at 30A and 52 allow lighting control in accordance with a system control unit or some local signal, for example active infra-red. The presence or absence of a signal on line 40X determines whether a control functions is for lights "on" or "off". There can be "master" control, particularly for "off" and additional photocell control, see "ANDing" of any selected system signal on 44A, B and local occupancy sensing, all as an integral part of a highly versatile system generally specifiable at the control unit and capable of fine-tuning of operation at each receiver unit.

A revised arrangement particularly suited to override of passive infra-red response, effectively inverting action of latches 132A, B until timing out for non-occupancy after override operation, utilises local channel B selector (switch 50B) also to select channel A for setting of latches 132A, B/70A, B and resetting of latches 70A, B, the latter further using OR-ing with signals on line 40X and with output of monostable 104 instead of 118—all shown dashed on FIG. 1 plus X's for OR-gating and bracketing for omitted branches of output 126 from monostable 118.

Then, logic circuitry within the dashed box 150 facilitates overriding lights "on" due to occupancy sensing, as may be required where an area or space is used for overhead projection displays, etc, and such override will remain in operation throughout continued occupancy, but reset to normal operation occurs if the area or space is vacated for a sufficient time, whereafter lights will come "on" at next occupancy sensing.

It is preferred that receiver units as described and illustrated are permanently connected to mains electrical supply, and include their own electronic circuit power supply operative therefrom and as indicated in FIG. 1.

Connections of receiver units in series one after the other for common or extended control utilises the sockets 20A-E that also serve for connection to occupancy sensors. Link connections from one receiver unit to the next in such circumstances will serve to take on the system control input (30A), say using 30', local switch select signals (54A, B) and occupancy sense input (100A) between the interconnected receiver units.

Local-only control units do not require input etc. from central control (30A), and a corresponding mode for the illustrated receiver units results of the tuner 30A are simply left unconnected.

Typical option selection at the switches 42A, B for controlling in which of prescribed conditions each channel is to be operative can include whether or not public area lighting, whether or not involved in minimum or higher level of lighting (such as when 10% or 25% or whatever of lighting is to be on), whether lighting concerned is to be subject to some central override (say according to photocell sensing of ambient light at different sides of a building), whether lighting to be active at fall-back to any stand-by generator (or when load-shedding is necessary), or involved in related other means (such as heating/ventilating, emergency lighting, etc), or for a security requirement, etc.

We claim:

1. Apparatus for controlling electrical circuits including lighting circuits, comprising at least one remotely controlled receiver unit responsive to received encoded control signals, said at least one receiver unit comprising:
    means for decoding at least a portion of said received encoded control signals relating to at least two controlled channels for said electrical circuits to produce decoded control signals,
    signal providing means for each of said at least two controlled channels responsive to said decoded control signals for providing signals to control each of said controlled channels, and selection circuit means coupled between said decoding means and said signal providing means for selecting whether or not particular said decoded control signals result in said provided signals being available to control said channels.

2. The apparatus according to claim 1, wherein said at least one receiver unit further comprises:
override means for providing a local override of said decoded and selected control signals.

3. Apparatus for controlling electrical circuits including lighting circuits, comprising at least one local control unit local to an area served by at least one of said electrical circuits, each of said at least one local control unit comprising:
switching circuit means responsive to local occupancy for switching one or more of said electrical circuits within said area, and
override circuit means responsive to received locally originating signals for overriding said switching circuit means irrespective of local occupancy.

4. The apparatus according to claim 3, wherein said at least one local control unit further comprises:
timing means triggered after operation of the override means and after a predetermined period of absence of local occupancy to cause said switching means to revert to operation in response to local occupancy.

5. The apparatus according to claim 3, wherein said at least one local control unit further comprises:
link connection means for chaining local control units together in groups.

6. The apparatus according to claim 3, wherein said at least one local control unit further comprises:
decoding means for decoding control signals received from said central control unit and producing decoded signals,
signal providing means responsive to said decoded signals for providing signals to at least one of said electrical circuits, and
selection means for selecting whether particular said decoded signals result in said signals being provided to said electrical circuits.

7. The apparatus according to claim 6, further comprising:
a central control unit for producing control signals relative to overall requirements related to hours of daylight and/or time of use of premises served,
encoding means for encoding said control signals to produce encoded control signals, and
transmission means for transmitting said encoded control signals to said at least one local control unit.

8. The apparatus according to claim 7, wherein the said at least one local control unit is selectively operable relative to local requirements related to settings of the said selection means for selecting and to override means and emergency indication including operation of emergency circuits.

9. The apparatus according to claim 6, wherein said transmission means further comprises:
serial-line connections between said central control unit and said at least one local control unit operative to supply signals in a pulse-position modulated manner to the decoding means of a said at least one local control unit.

10. The apparatus according to claim 9, wherein said serial-line connections include at least one line subject to current sinking for triggering said timing means for at least one group of local control units.

11. Apparatus according to claim 6 wherein said decoding means further includes:
at least one output for specifying "on" or "off" commands for at least one of said electrical circuits.

12. Apparatus for controlling electrical circuits including lighting circuit comprising at least one local control unit for controlling related said circuits, said at least one local control unit comprising:
at least two controlled channels each serving different groups of said related circuits in terms of supply of load drive signals to said related circuits,
selection means for determining which of each of plural possible control signals can pass to each of said controlled channels,
decoding means for supplying others of said possible control signals by decoding encoded control signals received by said at least one local control unit from a remote central control unit,
local occupancy sensing signal supply means for supplying at least one of said possible control signals, and
means for transmitting signals corresponding to said at least one possible control signal from said at least one local control unit to said remote central control unit.

* * * * *